(12) United States Patent
Ladanyi

(10) Patent No.: US 10,639,849 B2
(45) Date of Patent: May 5, 2020

(54) METHOD AND SYSTEM FOR 3D PRINTER WITH IMPROVED PERFORMANCE AND 3D PRINTER EMPLOYING SAME

(71) Applicant: Robert Ladanyi, Woodbridge (CA)

(72) Inventor: Robert Ladanyi, Woodbridge (CA)

( * ) Notice: Subject to any disclaimer, the term of this patent is extended or adjusted under 35 U.S.C. 154(b) by 0 days.

(21) Appl. No.: 15/816,035

(22) Filed: Nov. 17, 2017

(65) Prior Publication Data

US 2018/0126656 A1 May 10, 2018

Related U.S. Application Data

(63) Continuation of application No. 15/529,015, filed as application No. PCT/CA2015/051228 on Nov. 24, 2015.

(60) Provisional application No. 62/083,311, filed on Nov. 24, 2014.

(51) Int. Cl.

| | |
|---|---|
| *B29C 69/00* | (2006.01) |
| *B29C 64/393* | (2017.01) |
| *B33Y 30/00* | (2015.01) |
| *B33Y 40/00* | (2020.01) |
| *B29C 64/343* | (2017.01) |
| *B33Y 50/02* | (2015.01) |
| *B29C 64/118* | (2017.01) |

(Continued)

(52) U.S. Cl.
CPC .......... *B29C 64/393* (2017.08); *B29C 64/118* (2017.08); *B29C 64/209* (2017.08); *B29C 64/227* (2017.08); *B29C 64/343* (2017.08); *B33Y 30/00* (2014.12); *B33Y 40/00* (2014.12); *B33Y 50/02* (2014.12)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS 6,085,957 A 7/2000 Zinniel et al.
2004/0221201 A1* 11/2004 Seroff ................. G06F 11/3636
714/30

(Continued)

FOREIGN PATENT DOCUMENTS

CN 203496156 U 3/2014

OTHER PUBLICATIONS

Office Action for Chinese Patent Application No. 201580074239.6 dated Dec. 21, 2018.

(Continued)

*Primary Examiner* — Ryan M Ochylski
(74) *Attorney, Agent, or Firm* — Millman IP Inc.

(57) ABSTRACT

In an aspect, a 3D printer is provided and includes a print head having an extruder motor (that is a stepper motor) positioned to feed a filament into a heater, a print head positioning system configured to move the print head relative to a print surface, a stepper driver that is connected to the extruder motor and is operable to control the operation of the extruder motor, a sensor module that includes a feed rate sensor positioned to detect a rate of feed of the filament, and a control system that is programmed to: receive signals from the sensor module that are indicative of the feed rate of the filament, and control the operation of the stepper driver based on the signals from the sensor module.

1 Claim, 18 Drawing Sheets

(51) Int. Cl.
*B29C 64/209* (2017.01)
*B29C 64/227* (2017.01)

(56) References Cited

U.S. PATENT DOCUMENTS

| | | | |
|---|---|---|---|
| 2009/0273122 A1* | 11/2009 | Batchelder | B29C 47/0014 |
| | | | 264/401 |
| 2012/0092724 A1 | 4/2012 | Pettis | |
| 2013/0313743 A1 | 11/2013 | Rockhold | |
| 2014/0034214 A1 | 2/2014 | Boyer et al. | |
| 2014/0070461 A1 | 3/2014 | Pax | |
| 2014/0265040 A1 | 9/2014 | Batchelder | |
| 2014/0271964 A1 | 9/2014 | Roberts, IV et al. | |
| 2015/0084222 A1* | 3/2015 | Heston | B29C 47/003 |
| | | | 264/40.7 |

OTHER PUBLICATIONS

Office Action—U.S. Appl. No. 15/529,015 dated Jul. 2, 2018.
Office Action for U.S. Appl. No. 15/529,015 dated Mar. 22, 2019.
Extended European Search Report for EP Application No. 15862357.9 dated Aug. 1, 2018.

* cited by examiner

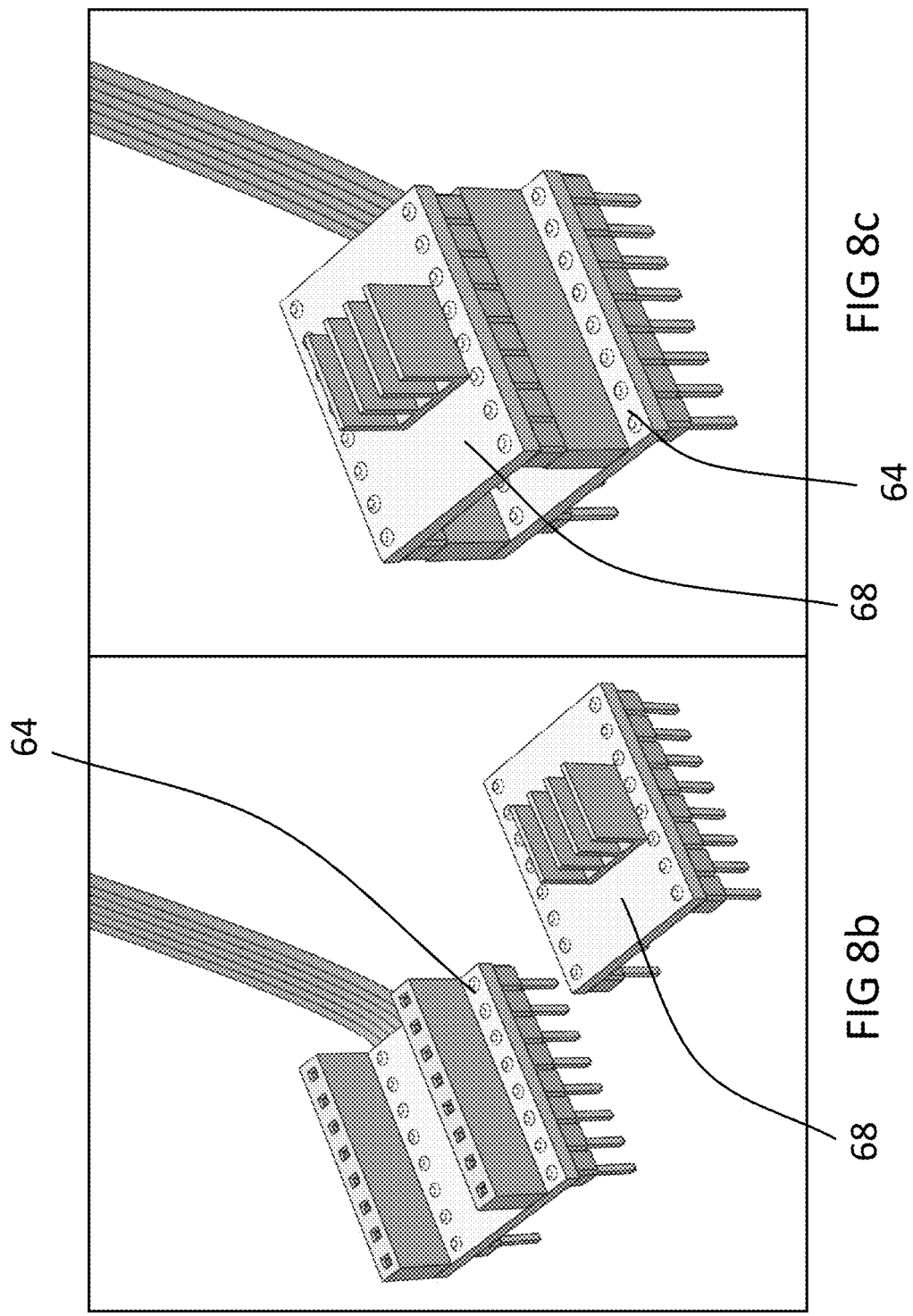

METHOD AND SYSTEM FOR 3D PRINTER WITH IMPROVED PERFORMANCE AND 3D PRINTER EMPLOYING SAME

CROSS-REFERENCE TO RELATED APPLICATIONS

This application is a continuation of U.S. patent application Ser. No. 15/529,015, filed May 23, 2017 as a national phase entry of PCT application PCT/CA2015/051228, filed Nov. 24, 2015, which claims priority to U.S. Provisional Patent Application No. 62/083,311, filed Nov. 24, 2014, the contents of which are incorporated herein in their entirety.

FIELD OF DISCLOSURE

This disclosure relates generally to the 3D printers and more particularly to retrofit systems for 3D printers.

BACKGROUND OF DISCLOSURE

Reference is made to FIGS. 1 and 2, which show examples of products made using 3D printers of the prior art, in which errors occurred during the printing process.

It would be beneficial to provide a 3D printer in which at least some printing errors can be avoided or eliminated.

SUMMARY

In an aspect, a 3D printer is provided and includes a print head having an extruder motor (that is a stepper motor) positioned to feed a filament into a heater, a print head positioning system configured to move the print head relative to a print surface, a stepper driver that is connected to the extruder motor and is operable to control the operation of the extruder motor, a sensor module that includes a feed rate sensor positioned to detect a rate of feed of the filament, and a control system that is programmed to: receive signals from the sensor module that are indicative of the feed rate of the filament, and control the operation of the stepper driver based on the signals from the sensor module.

In another aspect, a retrofit system for a 3D printer is provided, wherein the 3D printer includes a print head having an extruder motor positioned to feed a filament into a heater, wherein the extruder motor is a stepper motor, a print head positioning system configured to move the print head relative to a print surface, a stepper driver that is connected to the extruder motor and is operable to control the operation of the extruder motor, and a main controller configured for controlling the operation of the extruder motor via the stepper driver. The retrofit system includes a sensor module that includes a feed rate sensor positioned to detect a rate of feed of the filament, and an intercept controller that receives low level commands from the main controller and which is programmed to:

receive signals from the sensor module that are indicative of the feed rate of the filament, and control the operation of the stepper driver based on the signals from the sensor module.

In another aspect, a 3D printer is provided and includes a print head having an extruder motor positioned to feed a filament into a heater, wherein the extruder motor is a stepper motor, an X and Y print head positioning system configured to move the print head along two orthogonal directions that are parallel to a print surface wherein the X and Y print head positioning system includes X positioning motor and a Y positioning motor which are configured to move the print head in the X and Y directions respectively, a stepper driver that is connected to the extruder motor and is operable to control the operation of the extruder motor, an X encoder positioned to sense rotation of the X positioning motor, and a Y encoder positioned to sense rotation of the Y positioning motor, and a control system that includes a main controller that is programmed to receive a high level command from a command feed device, wherein the high level command indicates a target position for the print head and that is programmed to send low level commands to the X and Y positioning motors to move the print head to the target position, and an intercept controller that is programmed to receive the high level command, and to receive signals from the X encoder and the Y encoder that are indicative of the actual position of the print head, and, upon detection by the intercept controller of an error in the actual position of the print head as compared to the target position, to cause movement of the print head to eliminate the error.

In another aspect, a retrofit system for a 3D printer, wherein the 3D printer includes a print head having an extruder motor positioned to feed a filament into a heater, wherein the extruder motor is a stepper motor, an X and Y print head positioning system configured to move the print head along two orthogonal directions that are parallel to a print surface wherein the X and Y print head positioning system includes X positioning motor and a Y positioning motor which are configured to move the print head in the X and Y directions respectively, a stepper driver that is connected to the extruder motor and is operable to control the operation of the extruder motor, and a main controller that is programmed to receive a high level command from a command feed device, wherein the high level command indicates a target position for the print head and that is programmed to send low level commands to the X and Y positioning motors to move the print head to the target position. The retrofit system includes an X encoder positioned to sense rotation of the X positioning motor, and a Y encoder positioned to sense rotation of the Y positioning motor; and an intercept controller that is programmed to receive the high level command, and to receive signals from the X encoder and the Y encoder that are indicative of the actual position of the print head, and, upon detection by the intercept controller of an error in the actual position of the print head as compared to the target position, to cause movement of the print head to eliminate the error.

BRIEF DESCRIPTION OF DRAWINGS

The foregoing and other aspects of the disclosure will be more readily appreciated by reference to the accompanying drawings, wherein:

FIG. 8b is a perspective view of a portion of the controller shown in FIG. 8a;

FIG. 8c is a perspective view of a modification to the portion of the controller shown in FIG. 8b;

DETAILED DESCRIPTION

Figure 1:
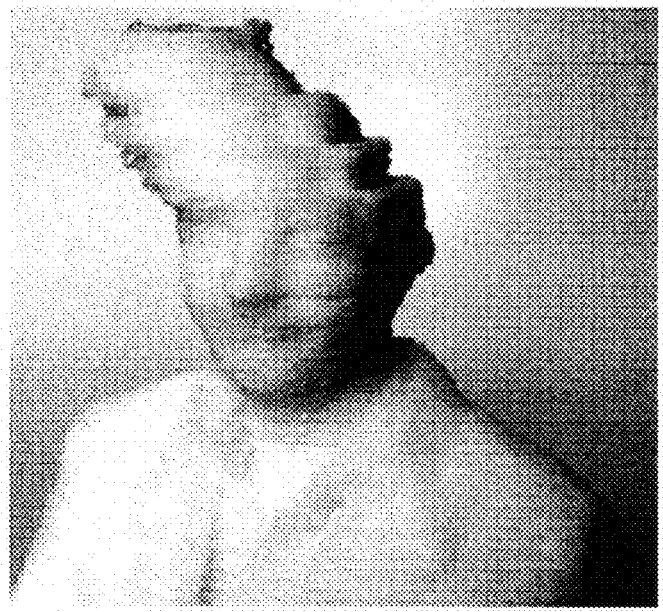
FIG. 1 is a perspective view of a 3D printed item with a sidestep type of error.
Figure 2:
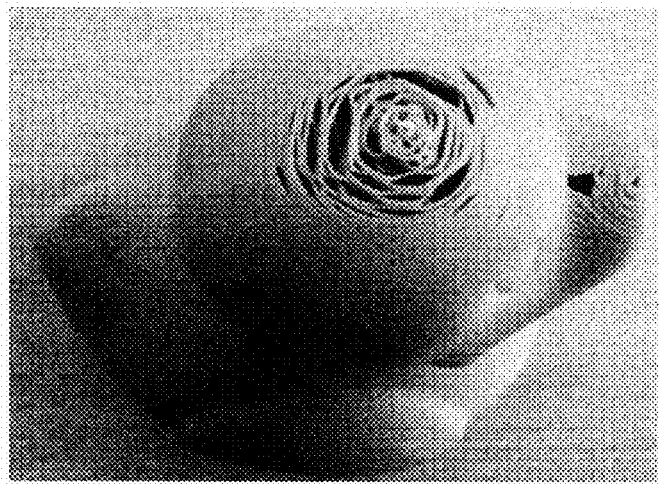
FIG. 2 is a perspective view of a 3D printed item with an error in which an insufficient amount of filament was deposited.
Figure 3:
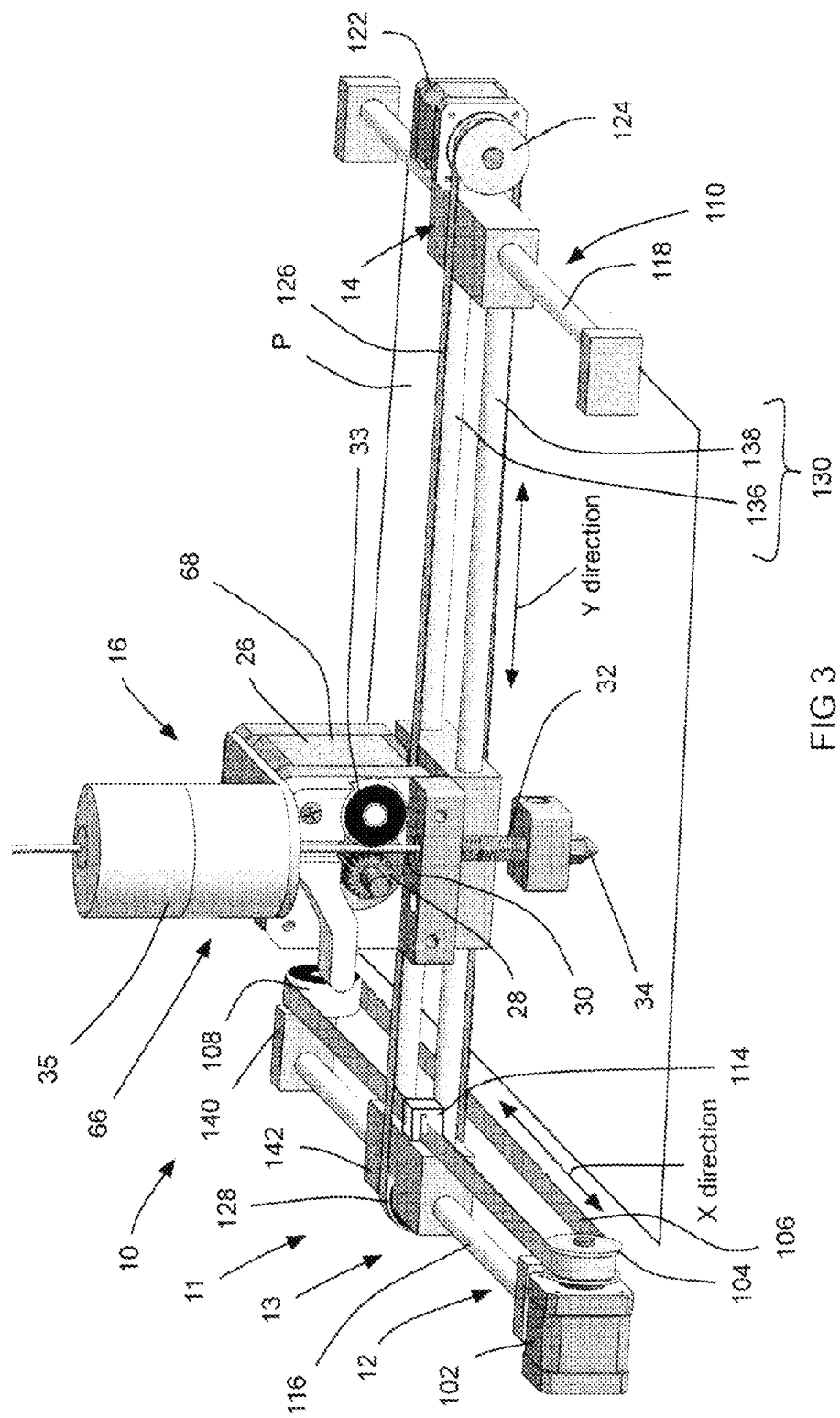
FIG. 3 is a perspective view of a 3D printer in accordance with an embodiment of the disclosure.

Reference is made to FIG. 3, which shows a printing system 10 that can be used, and which will reduce the likelihood of at least one of the types of printing errors shown in FIGS. 1 and 2.

The printing system 10 includes a print head 16, which is operable to deposit filament 30 on a print surface P, a print head positioning system 11, which may include a print head X and Y positioning system 13 configured for moving the print head 16 in X and Y directions (i.e. two orthogonal directions which are parallel to the print surface P), and a print head height positioning system (not shown).

The first print head X and Y positioning system may include a print head X positioning system 12 and a print head Y positioning system 14. The X positioning system 12 may include an X positioning system drive motor 102 having an X positioning system drive pulley 104, an X positioning system timing belt 106, an X positioning system idler pulley 108, and an X positioning system guide structure 110 which extends in an X direction (i.e. in a first of the two orthogonal directions). The timing belt 106 extends between the drive pulley 104 and the idler pulley 108. A carriage 112 is fixedly connected to the timing belt 106 via an X positioning system belt connector 114. The X positioning system drive motor 102 is drivable forwards and backwards to drive rotation of the pulley 104 forwards and backwards, which, in turn, drives the timing belt 106 forwards and backwards, thereby moving the carriage 112 along the guide structure 110 back and forth in the X direction. The guide structure may include one or more X positioning system guide bars 116 and 118 that extend in the X direction. The carriage 112 slides along the guide bars 116 and 118 back and forth in the X direction during driving of the timing belt 106.

The Y positioning system 14 may include a Y positioning system drive motor 122 having a Y positioning system drive pulley 124, a Y positioning system timing belt 126, a Y positioning system idler pulley 128, and a Y positioning system guide structure 130 which extends in a Y direction (i.e. in a second of the two orthogonal directions). The timing belt 126 extends between the drive pulley 124 and the idler pulley 128. The print head 16 is fixedly connected to the timing belt 126 via a Y positioning system belt connector 134. The Y positioning system drive motor 122 is drivable forwards and backwards to drive rotation of the pulley 124 forwards and backwards, which, in turn, drives the timing belt 126 forwards and backwards, thereby moving the print head 16 along the guide structure 130 back and forth in the Y direction. The guide structure 130 may include one or more Y positioning system guide bars 136 and 138 that extend in the Y direction. The print head 16 slides along the guide bars 136 and 138 back and forth in the Y direction during driving of the timing belt 126.

The teeth on the timing belts 106 and 126 are not depicted in the figures, for convenience only.

The X and Y directions are shown as being generally aligned with the edges of various components of the printer 10 such as the side edges of the print surface P. However, it will be noted that the X and Y directions need not be parallel to side edges of the print surface or to the other components of the printer 10; the X and Y directions could extend in any other suitable orthogonal directions that are parallel to the print surface P.

The X and Y print head positioning system 13 need not include two separate X and Y positioning systems 12 and 14, but could instead have any other configuration known in the art, including configurations in which there is a single integrated system for movement in two orthogonal directions.

The print head height positioning system (not shown) is configured for controlling the height of the print head 16 relative to the print surface P and may be any suitable print head height positioning system known in the art.

The print head assembly 16 includes an extruder that includes an extruder motor 26 with an output gear 28 that engages a filament 30 of print material and drives the filament 30 forward into a heating unit 32. The extruder motor 26 may be any suitable type of motor, such as a stepper motor that is controlled by a stepper driver 68.

A pinch wheel 33 is provided on the other side of the filament 30 so that the filament is pinched between the output gear 28 and the pinch wheel 33, so as to assist the output gear 28 in gripping the filament 30 when driving the filament 30 forward.

The heating unit 32 melts the filament 30 and the printer output member 34 deposits the molten filament 30 as needed.

There are several variables that can create error in the placement of filament 30 by the printer. For example, variations in the temperature of the filament 30, variations in the traction of the extruder motor output gear 28 on the filament 30, tolerance stackup in the print head assembly 16 (particularly as the tolerances change during changes in direction of the extruder motor 26 when it is desired to momentarily stop depositing of the molten filament 30 and subsequently start depositing the molten filament 30 again), all affect the accuracy of the positioning of the filament 30.

The printing system 10 (which may also be referred to as a printer 10) controls the speed of the extruder motor 26, and the first and second print head positioning motors in the print head movement mechanisms 12 and 14, in order to control the thickness of molten filament 30 that is deposited from the output member 34.

FIG. 3 shows a sensor module 66 that is part of the print head 16. The sensor module (and therefore the print head 16) includes a sensor module filament transport member 43, one or more filament dimension-check sensors 36, and a filament linear feed rate sensor 50. In the example shown the sensor module (and therefore the print head 16) includes four filament dimension-check sensors 36, that measure the thickness of the filament 30 in four different angular positions about the circumference of the filament 30 as the filament 30 passes through the filament transport member 43.

The dimension-check sensors 36 may include Hall effect sensors 31 that sense the movement of plungers 42 that have magnets 53 thereon that are biased towards the filament 30 (e.g. by plunger biasing members 44, which are shown as compression springs that reside in a pocket in the sensor module housing 35 and which extend from an inner surface thereof. The sensors 31 can detect the movement of the plungers 42 that results from changes in the thickness of the filament 30 moving therepast. Thus, as a section of filament 30 moves past each of the sensors 36, signals are sent from the sensors 36 to a sensor module controller 40 that correspond to the thickness of the filament 30 in each dimension. The sensors 31 themselves may sit on intermediate circuit boards 39 that are C-shaped and that reside in slots 41 in the filament transport member 43. The intermediate circuit boards 39 transmit signals from the sensors 31 to the sensor module controller 40. The sensors 36 are shown in progressively higher magnification in FIGS. 4a and 4b.

Figure 5:
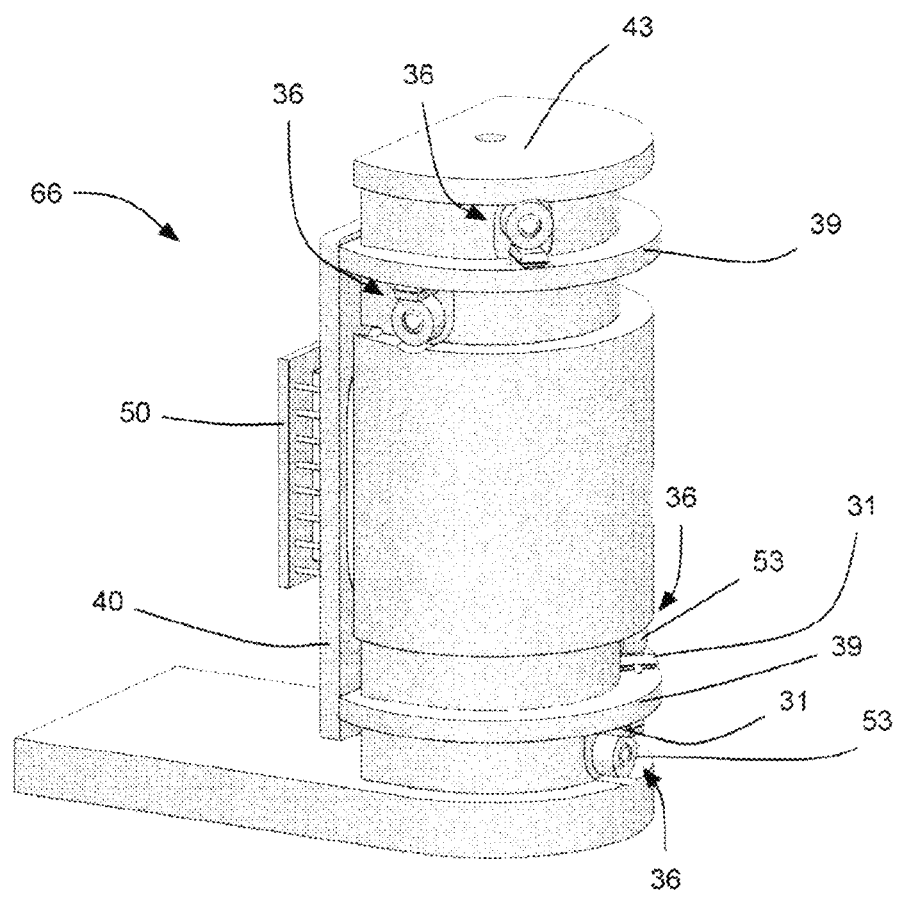
FIG. 5 is a magnified perspective view of a variant of the sensor module shown in FIG. 4.
Figure 6:
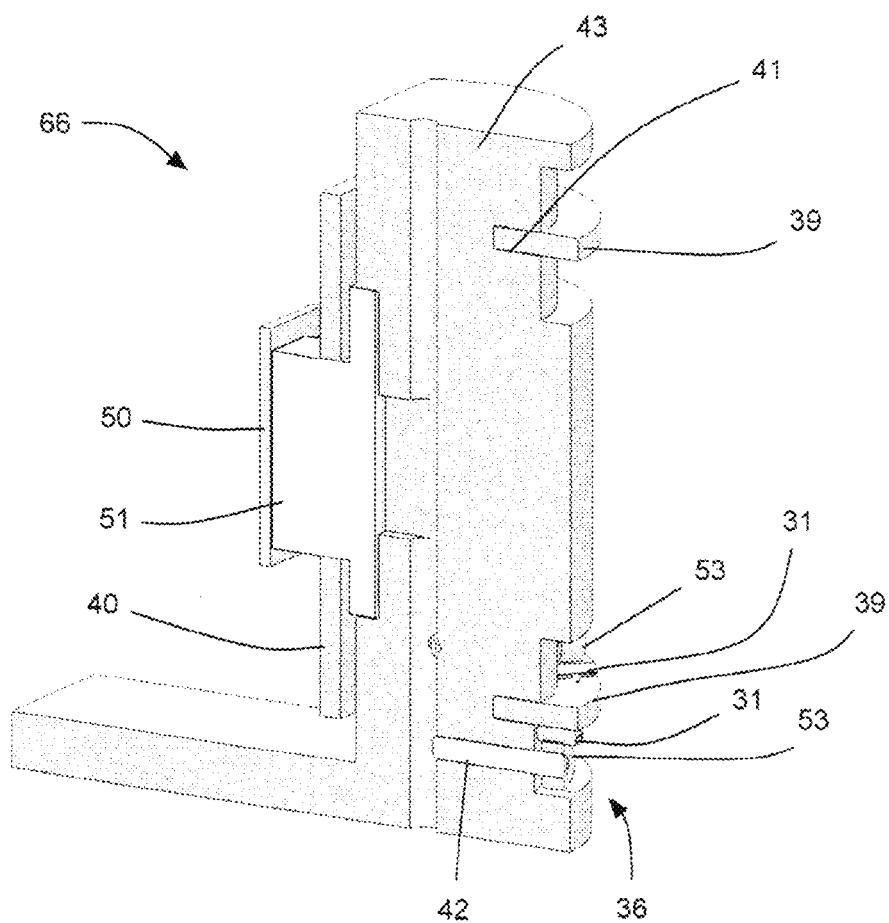
FIG. 6 is a sectional perspective view of the variant of the sensor module shown in FIG. 5.
Figure 6A:
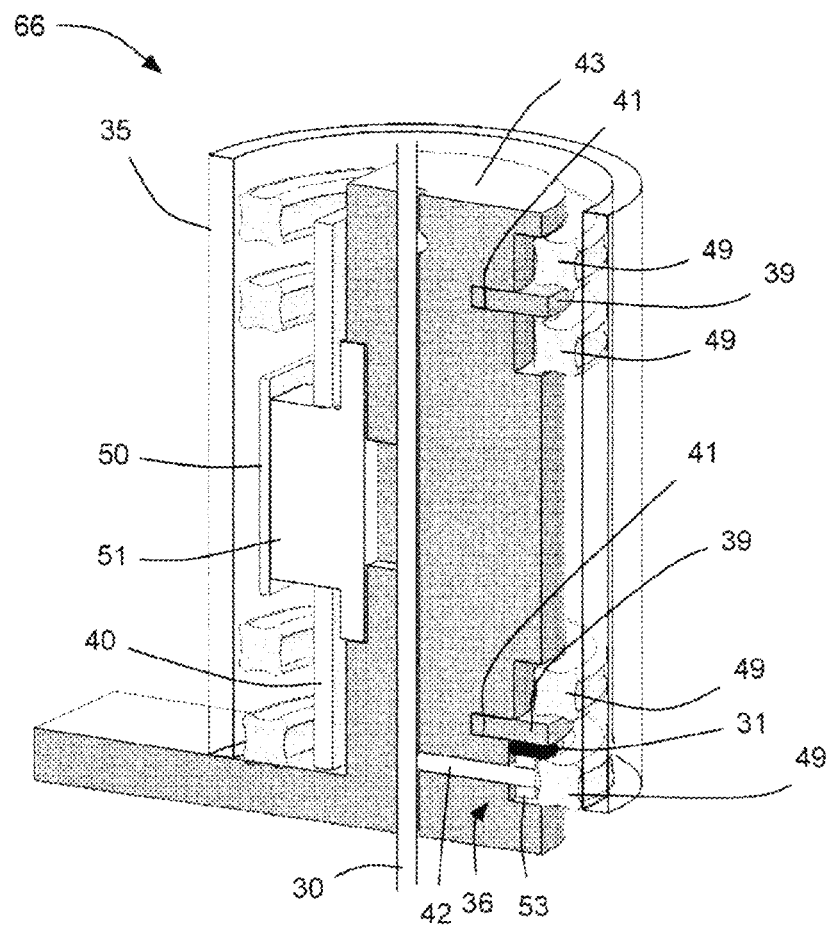
FIG. 6a is another sectional perspective view of the variant of the sensor module shown in FIG. 5 showing.

A variant shown in FIGS. 5, 6 and 6a, includes plunger biasing members 49 that are elastomeric rings that are positioned in the housing 35 (shown in transparent view in FIG. 6a) and which engage the plungers 42 to urge the plungers 42 into contact with the filament 30.

Figure 4:
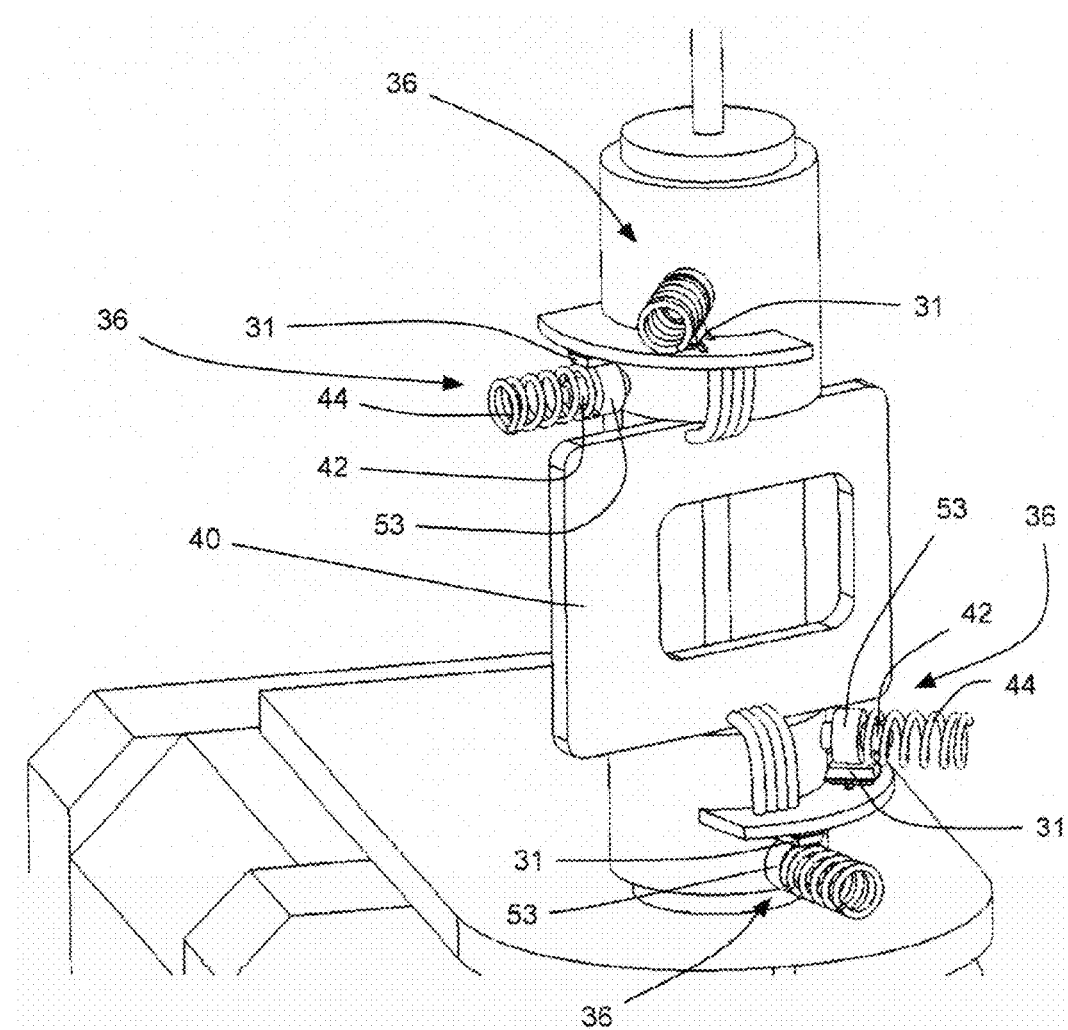
FIG. 4 is a magnified perspective view of a part of a sensor module from the 3D printer shown in FIG. 3.
Figure 4A:
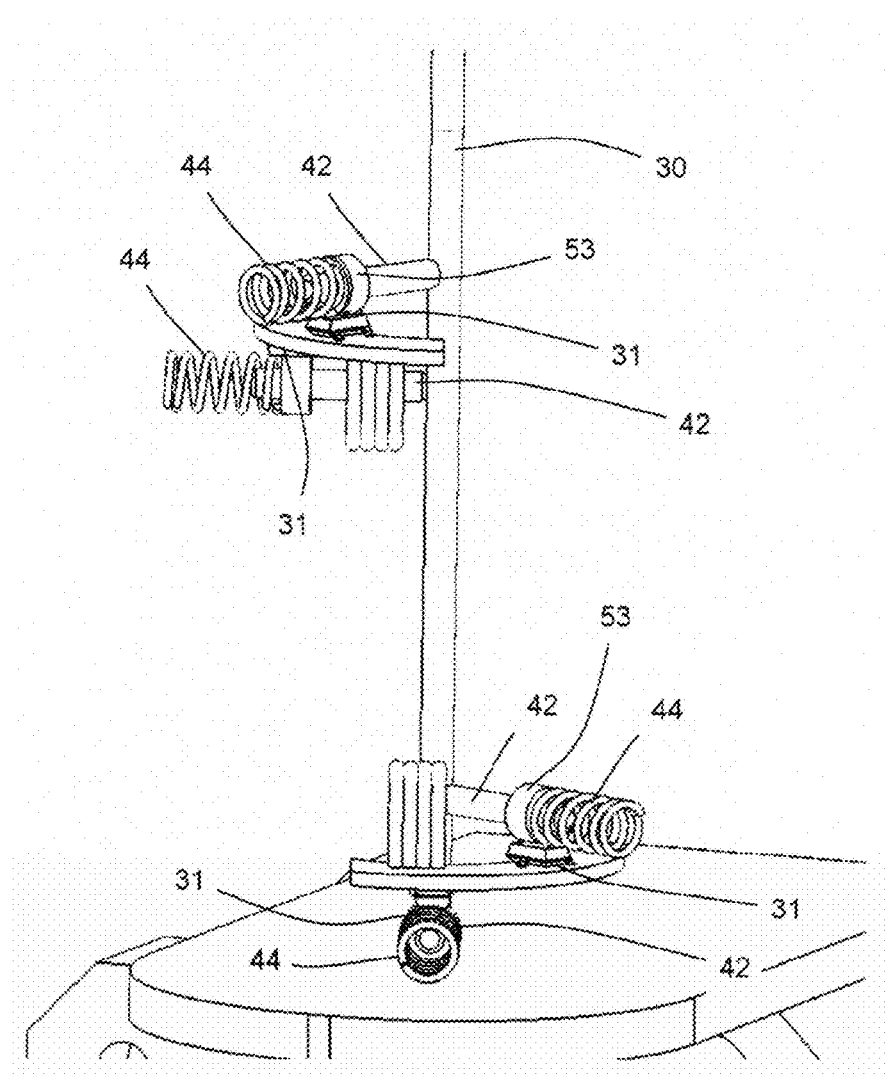
FIG. 4a is a more magnified perspective view of the part of the sensor module shown in FIG. 4.
Figure 4B:
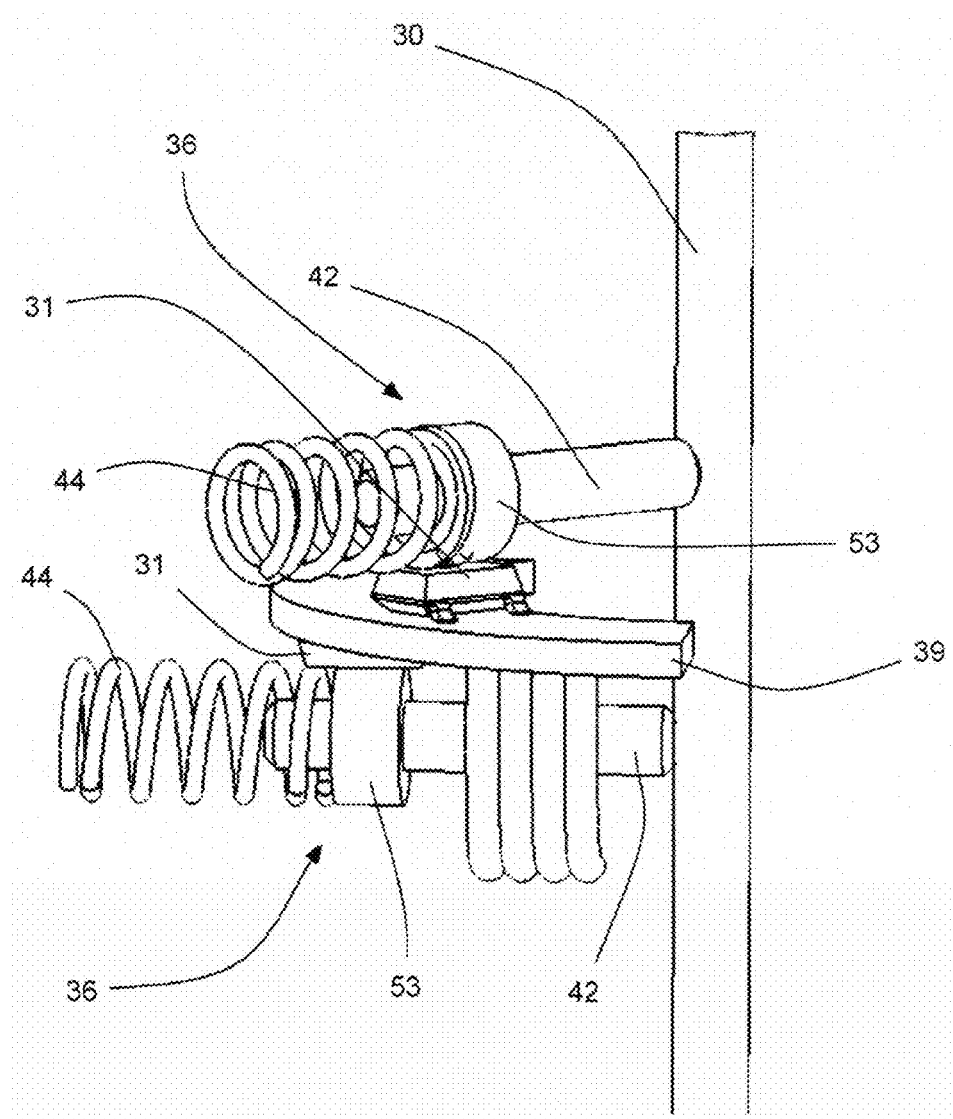
FIG. 4b is an even more magnified perspective view of the part of the sensor module shown in FIG. 4.

The sensor module 66 (and therefore the print head 16) may also include a linear feed rate sensor 50 which is omitted from FIG. 4 so as not to obscure the controller 40, but is shown in the variant shown in FIGS. 5, 6 and 6a. The linear feed rate sensor 50 is used to determine the linear feed rate of the filament 30. This sensor 50 may be any suitable type of sensor such as a laser sensor that is used on some advanced optical computer mice. The lens for the linear feed rate sensor 50 can be seen at 51 in FIG. 6 in particular.

Together, the sensors 36 and 50 can provide sufficient information for the controller 40 (or some other controller) to determine the volumetric feed rate of the filament 30. The sensors 36 and 50 may together be referred to as a volumetric feed rate sensor.

The controller 40 receives signals from the sensors 36 and 50 and determines whether to adjust the operation of the motor 26 in order to compensate for a difference in the actual feed rate of the filament as compared to a target feed rate for the filament 30. The target feed rate may be sent to the controller 40 by an external source based on a mathematical description of the item to be 3D printed.

If, for example, the temperature of the filament heating unit 32 drops, the filament may harden somewhat, resulting in increased backpressure resisting the driving forward of the filament 30 by the output gear 28. If this increased resistance results in a lower linear feed rate of the filament 30, this would be detected by the feed rate sensor 50 so that the controller 40 can determine the difference in the actual volumetric feed rate as compared to the target feed rate.

In another example, the filament 30 may have some natural variability in its dimensional stability, and may thus have thinner regions along some segments of its length. These thinner regions would be detected by one or more of the dimensional sensors, due to the movement of one or more plungers. The amount of movement would be relayed to the controller 40 in order to determine the actual difference in the dimensions of the filament 30 compared to the expected dimensions for it so that the actual difference in feed rate can be determined as compared to the target feed rate.

To control the motor 26 the controller 40 may send a series of pulses to the motor 26, wherein each pulse includes two elements, one element giving direction-of-rotation information and the second element being a 'go' command. In a typical stepper motor a pulse corresponds to a selected amount of angular movement (e.g. 1.8 degrees). The number of pulses that are sent to the motor 26 depends on how much filament 30 is to intended to be deposited based on the controller's stored information on the item to be 3D printed. If the controller 40 detects a drop in the actual feed rate of the filament 30 as compared to the target feed rate, the controller 40 may simply add one or more pulses to the sequence of pulses to the motor 26 so as to at least partially compensate for the reduced feed rate. For example, if the controller 40 determines that a particular line segment on the item being 3D printed requires 20 pulses and determines via the sensors 36 and 50 that the actual feed rate of the filament 30 is 33% lower than the target feed rate of the filament 30, then the controller 40 will add a suitable number of pulses to the sequence so as to achieve the desired amount of fed material. In this example, the controller 40 may add 10 pulses for example, so as to achieve the desired amount of fed material.

By providing the sensors 36 and 50 and the programming to adjust the feed rate based on signals from these sensors 36 and 50, the 3D printer 10 may achieve a lower error rate during printing than would occur with a 3D printer lacking the sensors 36 and 50. Thus by providing a printer such as printer 10 that included these features, the accuracy of the printer can be higher than its peers.

While the sensors 36 and 50 and suitable programming could be built-directly with the 3D printer 10 by a manufacturer, it is alternatively possible for the sensors 36 and 50 and the programming (e.g. on a separate controller) to be provided as an aftermarket retrofit system for installation on pre-existing 3D printers. For example, referring to FIG. 7, the existing printer may be generally shown at 58 and may include a main controller 60 and a print head 62, among other things such as print head movement mechanisms. The printer 58 may be converted to an embodiment of the printer 10 by way of addition of an intercept controller 64 and the sensor module 66. The intercept controller 64 may be installed on the printer 58 in such a way that the intercept controller 64 intercepts commands (which may also be referred to as instructions or step pulses) issued by the main controller 60 and then retransmits them to the print head stepper motor driver 68 which transmits them to the extruder motor 70 (which is a stepper motor). The sensors 36 and 50 transmit signals to the intercept controller 64 which determines, based on these signals, whether or not to add additional step commands (pulses) to the stepper motor driver 68.

The intercept controller 64 may be preprogrammed to carry out the actions described above, in order to facilitate installation and setup of the intercept controller 64.

Figure 8A:
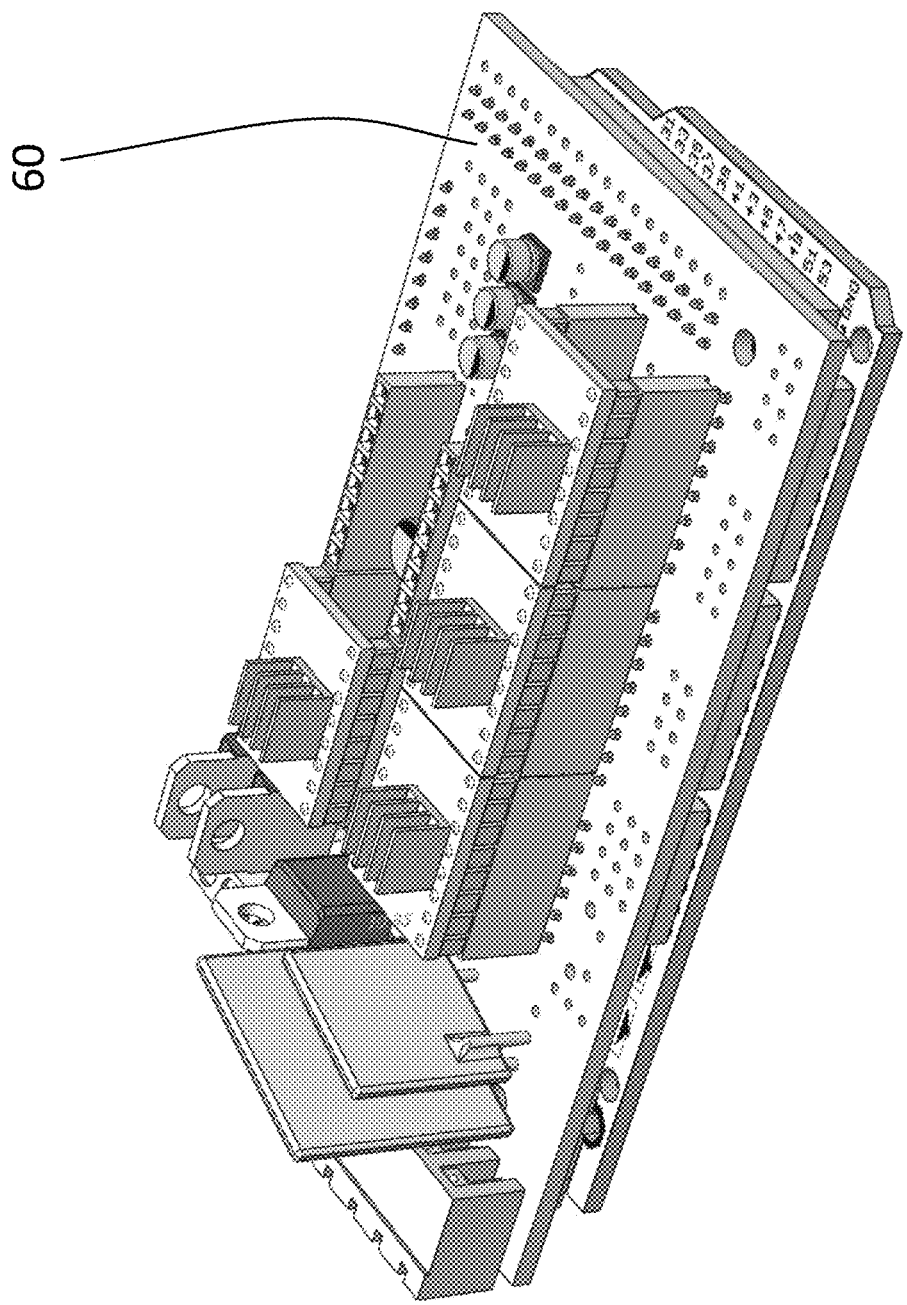
FIG. 8a is a perspective view of a controller from the printer shown in FIG. 1.
Figure 9:
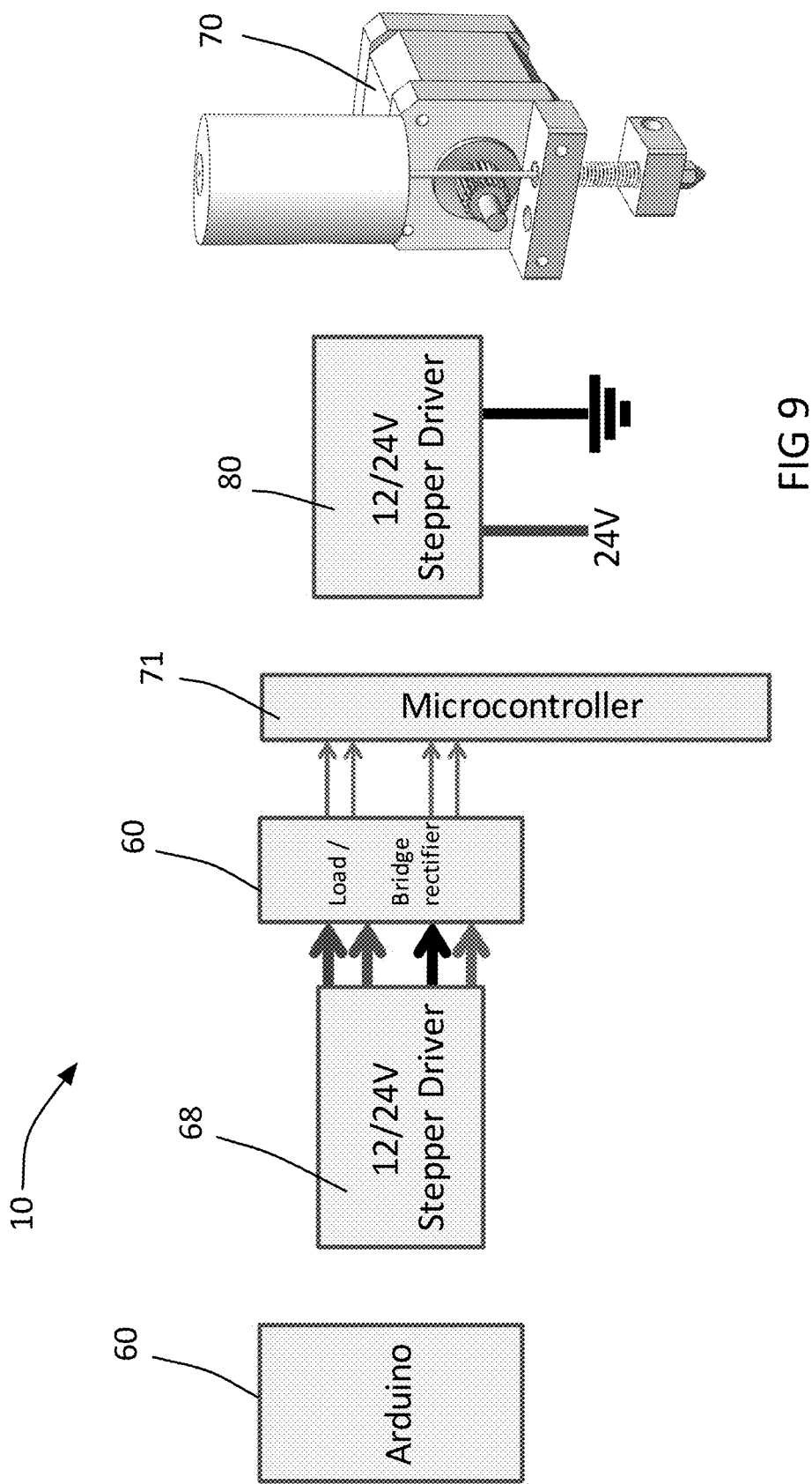
FIG. 9 is a schematic illustration of a variant of the printer shown in FIG. 1.

In some embodiments in which the stepper motor driver 68 is separate from the main controller 60, it is relatively easy to insert the intercept controller 64 in place between the controller 60 and the motor driver 68. Such an embodiment is shown in FIGS. 8a, 8b and 8c.

Alternatively, the intercept controller 64 may receive signals sent to the stepper driver 68, but the stepper driver 68 may remain connected to the stepper motor 70 so as to send step commands to the extruder motor 70. However, the intercept controller 64 may control a supplementary stepper driver, which is also connected to the motor 70. In such an embodiment, the intercept controller 64 may only send step commands to the supplementary driver and on to the extruder motor 70 to supplement the step commands send by the main controller 60.

Figure 10:
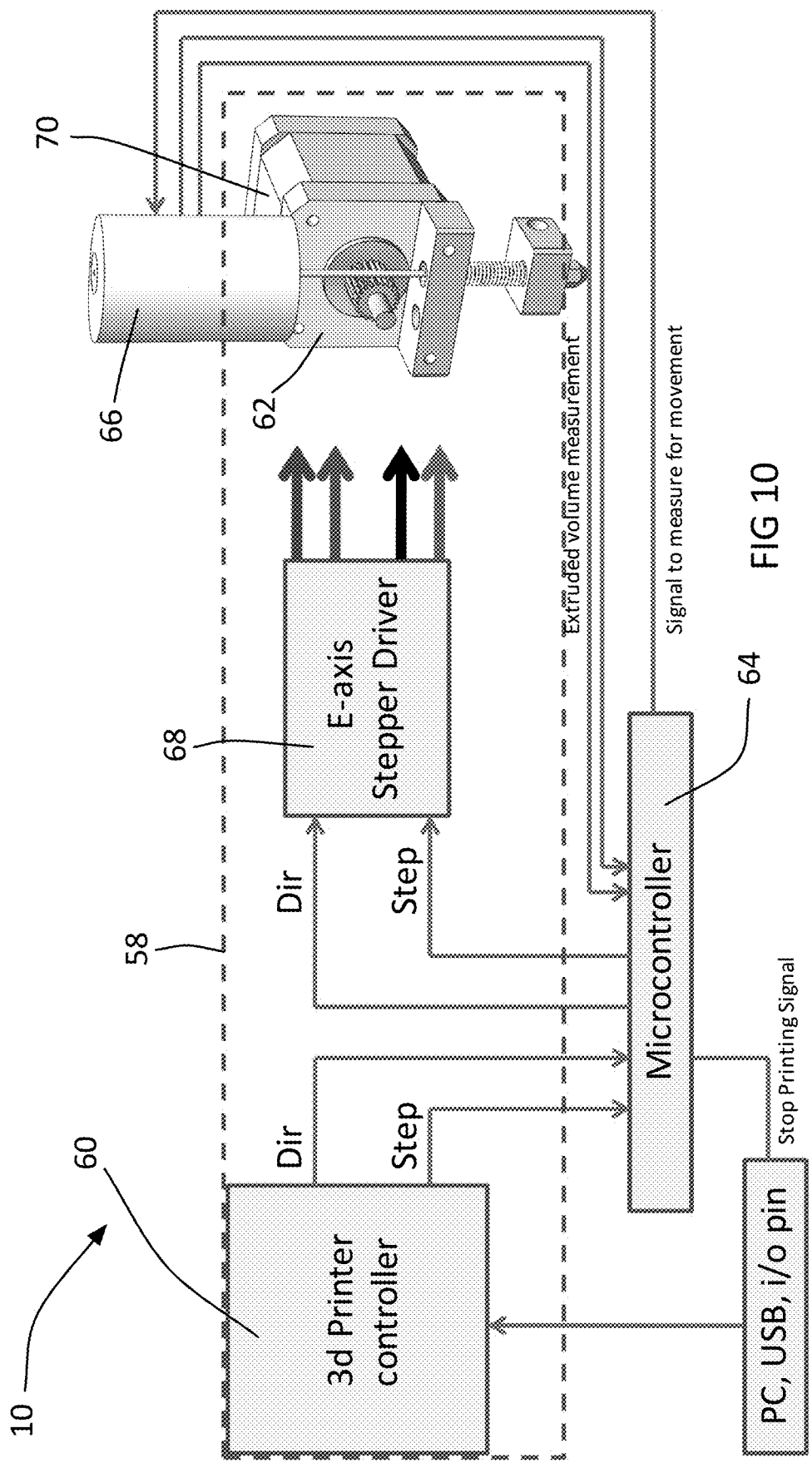
FIG. 10 is a schematic illustration of another variant of the printer shown in FIG. 1.
Figure 11:
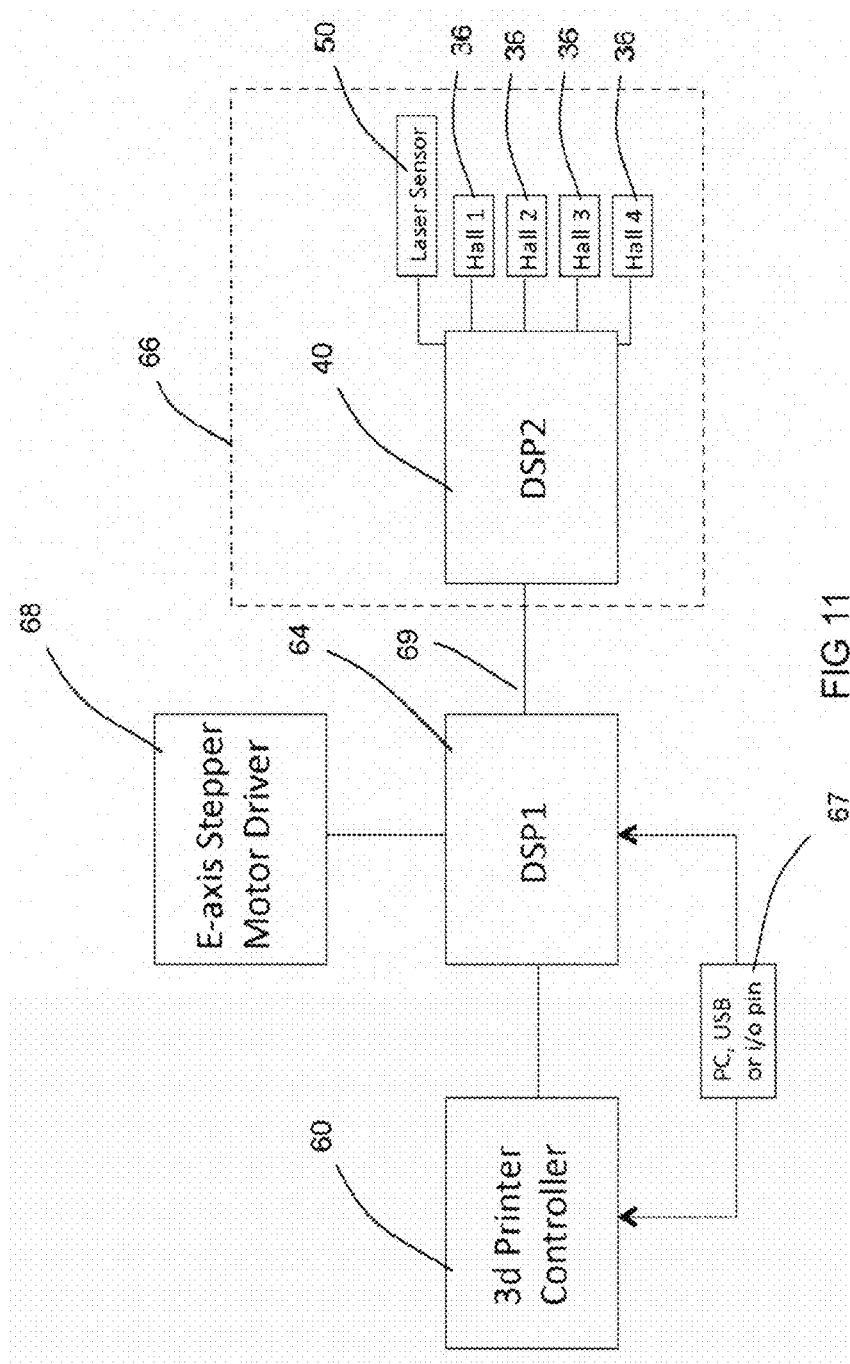
FIG. 11 is another schematic illustration of the variant of the printer shown in FIG. 10.

With reference to FIGS. 10 and 11, it has been found advantageous to provide several additional capabilities for the intercept controller 64. One additional capability is for the intercept controller 64 to be able to command the main controller 60 to stop a print job in the event that the intercept controller 64 determines that it is appropriate. For example, if the signals being sent to the intercept controller 64 are indicative that there has been substantially no feeding of filament 30 for more than a selected amount of time, then the intercept controller 64 may determine that the printer 10 is to be powered down so as to prevent the heater 32 from overheating and raising the risk of a fire developing. If such a determination is made, the intercept controller 64 can instruct the main controller 60 to power down the printer 10 so as to power down the heater 32, via a safety shutdown connection, which is shown at 67 in FIG. 10. The connection 67 may be a direct connection between the intercept controller 64 and an i/o pin on the main controller 60, or it may be a connection via USB, or, for example, it may be a connection to a separate PC that is itself connected to the main controller 60 and is capable of issuing instructions to the main controller 60.

Another capability that is advantageous is for the intercept controller 64 to instruct the laser sensor 50 to sense movement of the filament (via an intercept controller/sensor module connection 69), instead of relying passively on receiving signals from the laser sensor. It has been found that, by sending an instruction for the laser sensor 50 to sense for movement, the accuracy of the laser sensor can be increased for certain types of laser sensor, such as, the type of sensor that is used in some computer mice.

As can be seen in FIG. 11, it may be the sensor module controller 40 that actually receives the signal from the intercept controller 64 to initiate sensing by the laser sensor 50 for movement of the filament 30.

Figure 12:
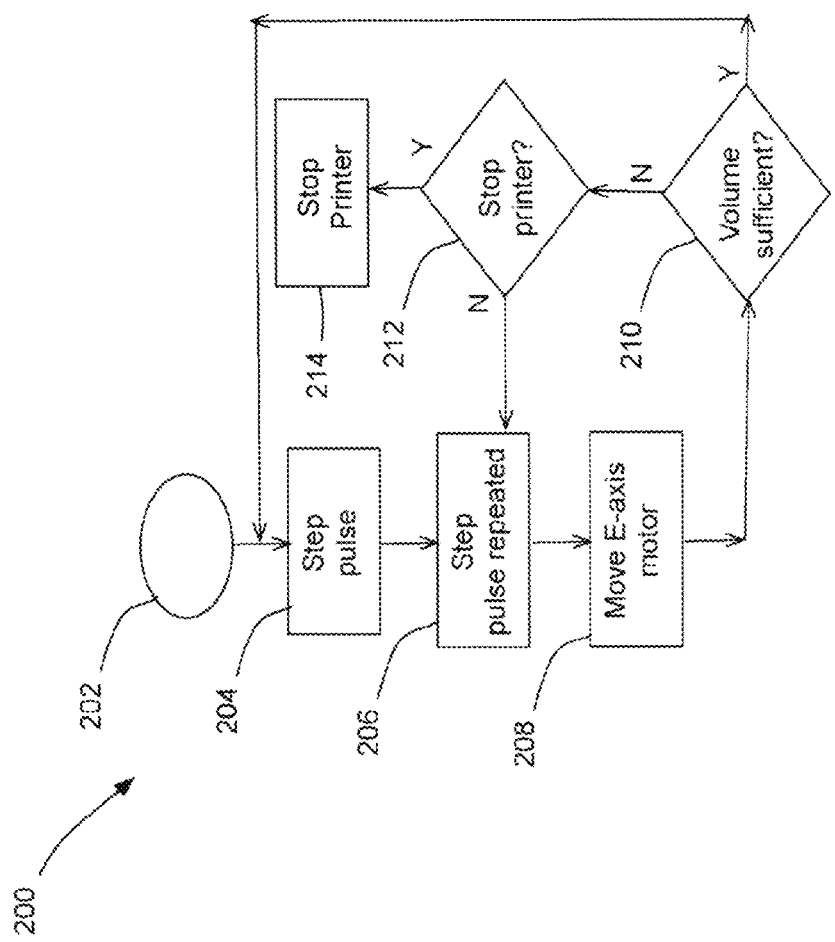
FIG. 12 is a flow diagram of a method of operating the printer shown in FIGS. 10 and 11.

Reference is made to FIG. 12, which shows a flow diagram of the operation of the printer 10 shown in FIGS. 10 and 11. The flow diagram is representative of a method 200 of operating the printer 10. The method 200 begins at 202. At step 204, a step pulse (i.e. an instruction to advance the filament and deposit it from the print head 16) is given by the main controller 60, which is intercepted by the intercept controller 64. At step 206, the step pulse is repeated by the intercept controller 64 to the stepper driver 68. At step 208 the intercept controller 64 or the sensor module controller 61 determines whether the sensed volume that has been moved by the extruder is the amount that has been requested by the main controller 60. If the volume moved by the extruder is determined to be the correct amount (i.e. if the volume is sufficient), then control is sent back to step 204. If the volume moved by the extruder is determined to be less than the correct amount (i.e. less than the amount requested by the intercept controller 64), then the intercept controller 64 makes a determination at step 210 as to whether or not it is appropriate to shut down the printer 10 based on the risk of a fire, or based on other criteria. If the determination is to shut down the printer 10, then control passes to step 212. If the determination is not to shut down the printer 10, then control passes to step 206 where the step pulse is repeated by the intercept controller 64 to the stepper driver 68 to attempt to cause the filament 30 to advance and the print head 16 to deposit filament 30 so as to make up for the shortfall in the amount of volume that was deposited as compared to the volume requested. In other words the intercept controller 64 is configured to repeat the step pulse (which may be referred to as a low level command) if the sensed volumetric feed rate is sufficiently low.

Figure 13:
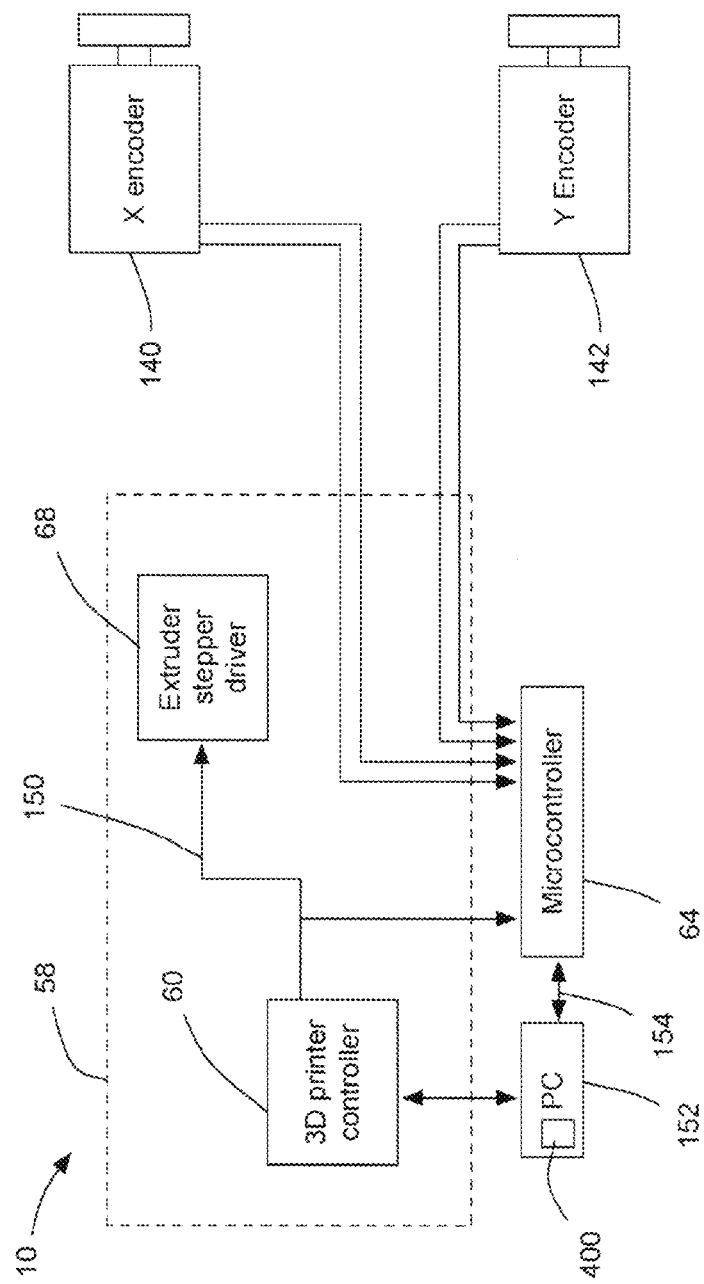
FIG. 13 is a schematic illustration of an optional feature of the printer shown in FIG. 10.

Reference is made to FIG. 13, which illustrates another optional feature of the printer 10 and of the retrofit system for the printer 58. In the embodiment shown in FIG. 13, the printer 10 is capable of providing inexpensive, closed loop position control for the X and Y positioning system 13 for the print head 62, without requiring a dedicated, local controller to implement closed loop position control on each of X positioning and Y positioning motors 102 and 122.

During operation of the printer 10, high level commands are sent to the controller 60 in batches. Each command indicates a target X position and Y position for the print head 16, and how much filament 30 is to be deposited while reaching the target X and Y positions. For example, a batch of five such high level commands may be sent to the controller 60, each high level command having a target X and Y position and a target amount of filament 30 to be deposited during the movement to that target position. During these movements to the target X and Y positions, it is possible that one or both of the X positioning and Y positioning motors 102 and 122 may not operate as intended and so positioning errors can occur in the position of the print head 16. Such positioning errors can result in shifting of portions of a print, resulting in a print similar to that which is depicted in FIG. 1 in particular, if no corrections are made during the printing operation. To address this problem, encoders shown at 140 and 142 are provided for determining the actual amount of movement taking place in the X and Y directions respectively. The encoders 140 and 142 may, if convenient, be mounted on the motors 102 and 122 respectively. Alternatively, the encoders 140 and 142 may be mounted anywhere suitable. For example, the encoders 140 and 142 may be provided as part of the idler pulleys 108 and 128 (as shown in FIG. 3). The encoders 140 and 142 may be any suitable types of encoders.

The encoders 140 and 142 each send a signal (e.g. a quadrature signal) back to the intercept controller 64 to indicate the actual position of the print head 16. The intercept controller 64 also taps into the line shown at 150 (FIG. 13) that is used to send low level commands from the main controller 60 to the stepper driver 68 (i.e. the series of direction and step signals). Each high level command may, for example, be made up of hundreds of low level commands. In other words, if the print head 16 is instructed in a high level command to move 1 inch in the X direction and 0 inches in the Y direction, this may be carried out by the main controller 60 sending hundreds of direction and step commands to the X positioning motor 102 each of which instructs the X positioning motor to move by one pulse length's worth of travel (e.g. which may be less than about two degrees of rotation of the motor 102). The command feed device that feeds the batches of high level commands is shown at 152 and may be, for example a PC. The command feed device 152 may also transmit the batches of high level commands to the intercept controller 64, via a command feed device-intercept controller connection 154

(which is shown as a wired connection. The connection 154 may optionally be a two-way connection, as is described further below.

Because the intercept controller 64 is provided with the high level commands, it is in possession of the target positions for the print head 16 (which are provided in the high level commands) at the end of each high level command. Additionally, because the intercept controller 64 is notified of the direction and step commands from the main controller 60, the intercept controller 64 can also determine when the print head 16 should reach the target position. As noted above, the intercept controller 64 is also in possession of the actual X and Y positions for the print head 16. When the intercept controller 64 determines that the print head 16 should reach a given target position, the intercept controller 64 can compare the actual position of the print head 16 to the target position of the print head 16. If the intercept controller 64 determines that there is an error (i.e. that the actual position does not match the target position), the intercept controller 64 can insert an additional command with a correction into the batch of commands that the main controller 60 has stored within it. Once the correction command is carried out the error in the position of the print head 16 is eliminated. The intercept controller 64 may be programmed to only insert the correction command into the batch of commands stored in the main controller 60 when the intercept controller 64 determines that there is sufficient time before the correction command will be carried out, in order to ensure that the movement of the print head 16 is not interrupted and sitting idle while the insertion of the correction command takes place.

Figure 14:
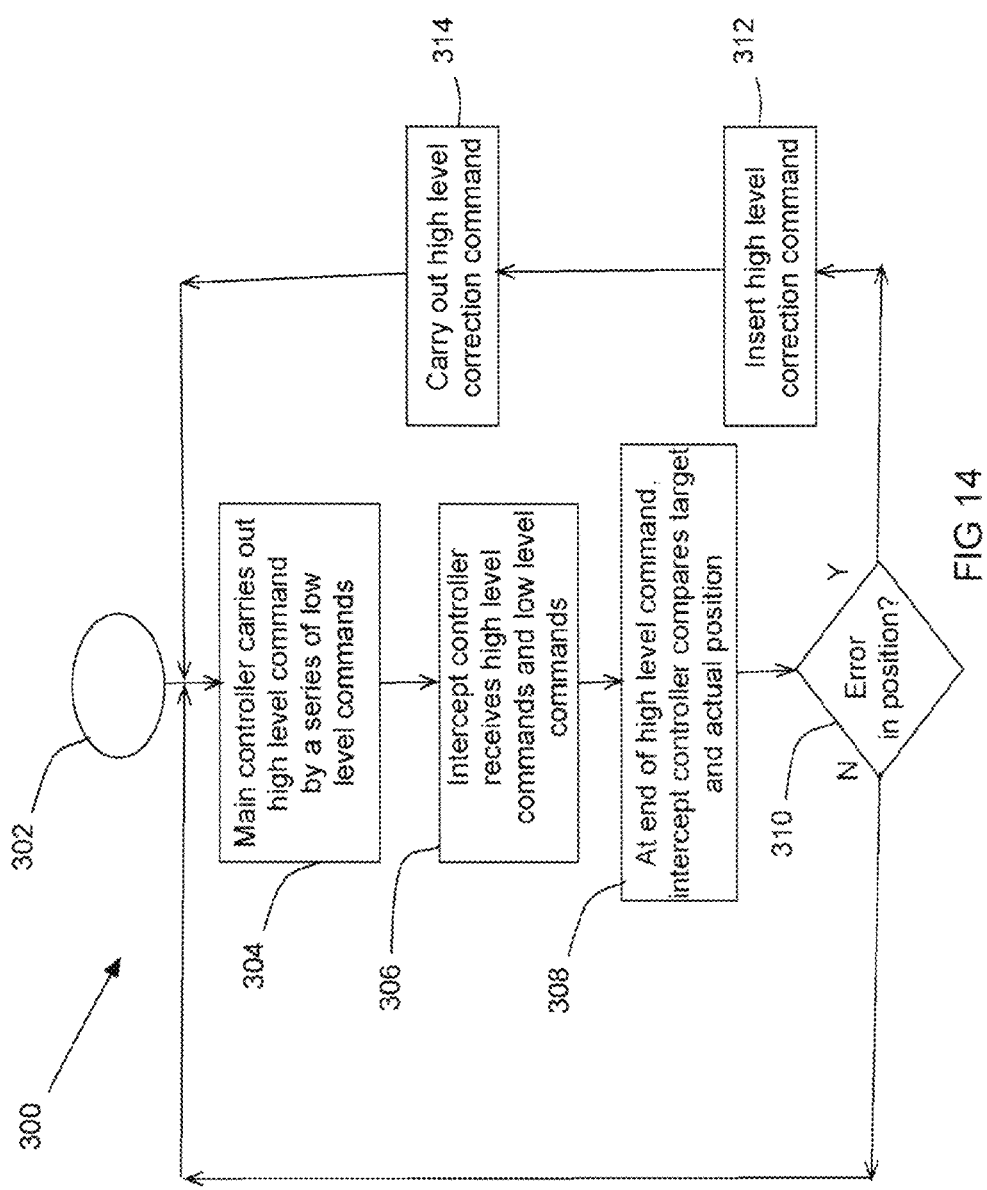
FIG. 14 is a flow diagram illustrating the operation of the printer shown in FIG. 13.

The above can be illustrated as a method 300 shown in FIG. 14. The method begins at 302. At step 304 the main controller 60 carries out an individual high level command by sending a plurality of low level commands to at least one of the X and Y positioning motors 102 and 122. At step 306, the intercept controller 64 receives low level commands from the main controller 60, and receives the high level command from the command feed device 152 (not necessarily at the same time). At step 308, at the end of carrying out the individual high level command (i.e. when the intercept controller 64 has determined that the print head 16 should have reached the target position), the intercept controller 64 compares the target position for the print head 16 with an actual position for the print head 16 based on the signals from the X and Y encoders 140 and 142. At step 310, the intercept controller 64 determines whether there is an error in the position of the print head 16, wherein the error is the difference between the target position and the actual position for the print head 16. If there is an error, then control is sent to step 312 where the intercept controller 64 inserts a high level correction command into a batch of commands stored in the main controller 60, wherein the high level correction command is configured to adjust the actual position of the print head to eliminate the error. At step 314, the correction command is carried out by the main controller 60 and the error is eliminated. It will be noted that several other high level commands may be carried out by the main controller 60 prior to carrying out of the correction command. If, on the other hand, there is no error determined in the actual position of the print head 16 as compared to the target position, then control is sent back to step 304 where the next high level command is carried out by the main controller 60.

The intercept controller 64 may be in communication with an actual movement storage device 400, which may be the hard drive of the command feed device 152 in embodiments where the command feed device 152 is, for example, a PC. The intercept controller 64 may send the actual positions of the print head 16 to the storage device 400. The storage device 400 may also receive the target positions for the print head 16, from either the intercept controller 64 or from the commands stored thereon in embodiments where the storage device 400 is the hard drive on the command feed device 152. By being in possession of both the actual and target positions of the print head 16, a user of the printer 10 may be able to determine how many correction commands were made and any patterns within the correction commands.

Figure 15B:
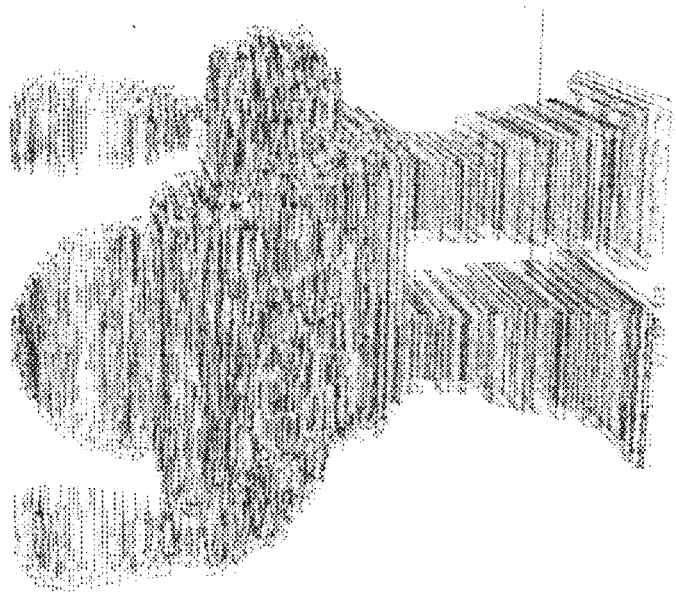
FIG. 15b is a visual representation showing what the print in FIG. 15a would have looked like if corrections had not been made during the printing process.
Figure 15A:
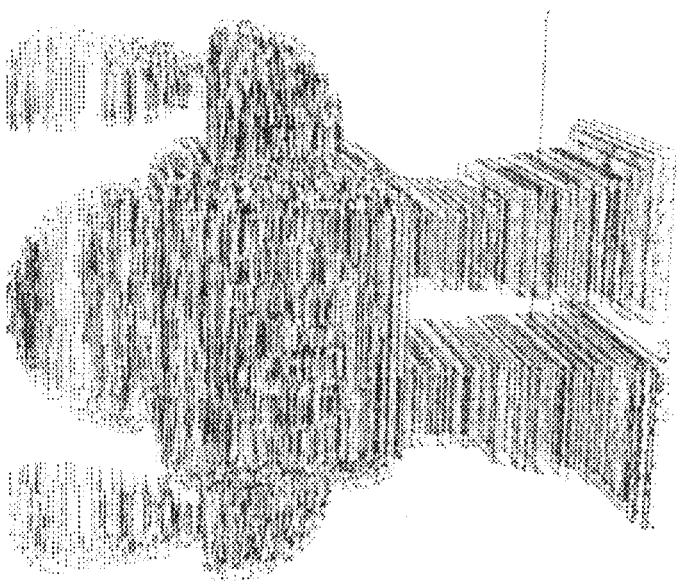
FIG. 15a is a visual representation showing an actual print and data representing errors that appeared during the print.

FIG. 15a is an example of a visual representation 500 of the stored target and actual position data for a particular printed item. The different shades that appear in the image are indicative of portions of the print where errors of different magnitudes were detected. FIG. 15b is another visual representation 502 that illustrates what the resulting print would have looked like, if the printer 10 had not discovered the errors and had not inserted the correction commands for carrying out by the main controller 60. In the example shown, it can be seen that there is significant positional error that would have resulted in the print had the print continued with no correction.

Figure 7:
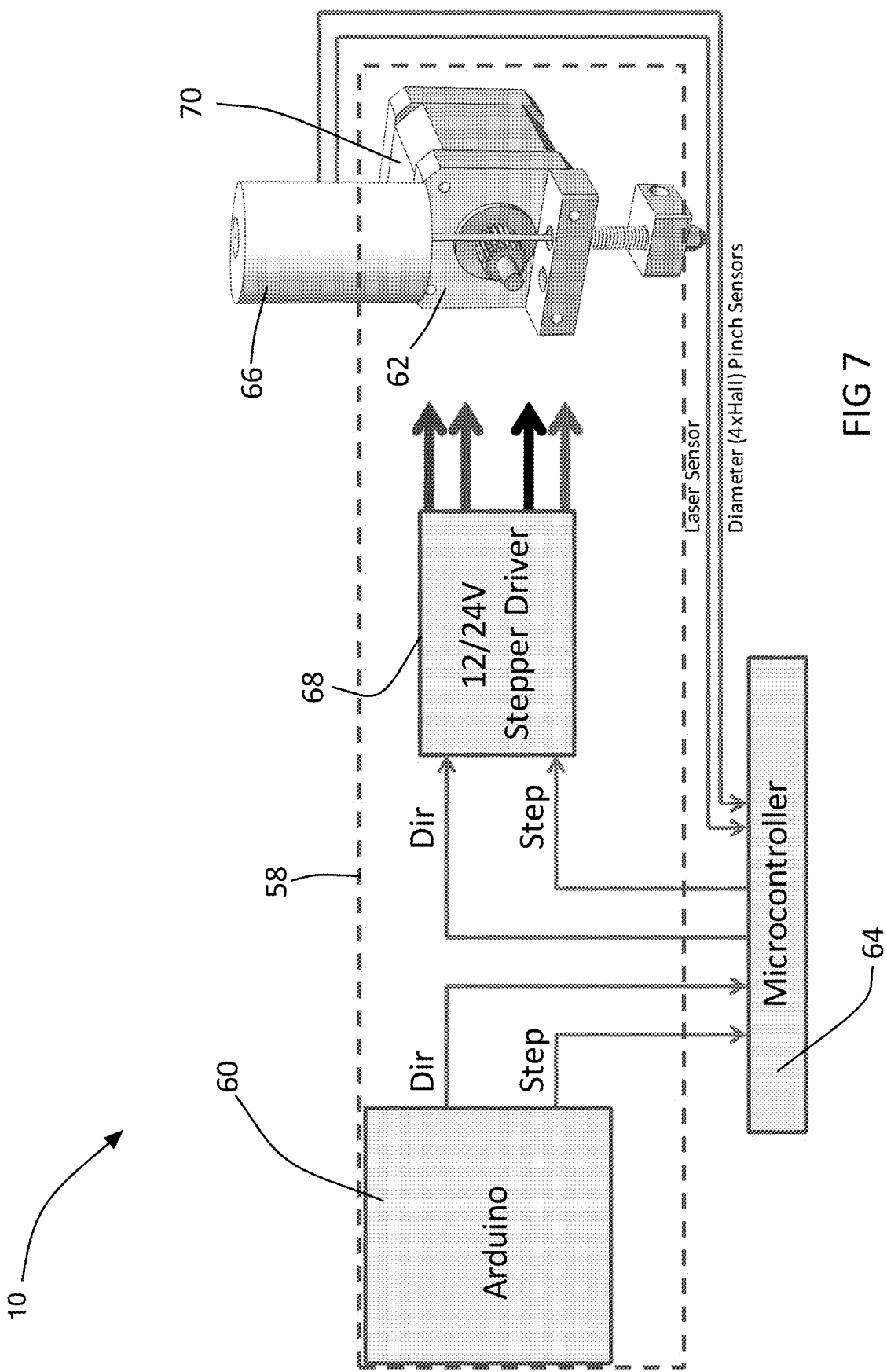
FIG. 7 is a schematic illustration of the printer shown in FIG. 1.

The feature of providing this closed loop position control may be provided directly by the manufacturer 10 on the original printer, or it can be provided as part of a retrofit system, either as part of the same retrofit system described in relation to FIG. 7, or as part of a different retrofit system for a printer 58 (FIG. 13). In either case, the X and Y encoders 140 and 142 are provided as part of the retrofit kit, along with the intercept controller 64, the programming for carrying out the method 300, and, if needed, the memory 400 if not already present.

While it is advantageous to provide the sensors 36 in the print head 16 or in the sensor module 66, it would still be advantageous to provide any of the above embodiments disclosed herein without the sensors 36 (i.e. with only the sensor 50 and other related elements). Similarly it would be advantageous to provide any of the above embodiments without the sensor 50 (i.e. with the sensors 36 and other related elements).

In embodiments in which elements are provided as part of a retrofit system, it will be understood that one or more controllers (e.g. the main controller 60, the intercept controller 64 and the sensor module controller 40) may be consolidated or separated further as desired based on the particular application. Accordingly, the overall printer 10 may have one or more controllers which make up a control system for the printer 10.

Those skilled in the art will understand that a variety of other modifications may be effected to the embodiments described herein without departing from the scope of the appended claims.

The invention claimed is:

1. A 3D printer, comprising:
a print head having an extruder motor positioned to feed a filament along an axis into a heater, wherein the extruder motor is a stepper motor;
a print head positioning system configured to move the print head relative to a print surface;
a stepper driver that is connected to the extruder motor and is operable to control the operation of the extruder motor;
a filament transport member having a filament passageway;
a laser sensor that is positioned to face the filament passageway and to detect feeding of the filament through the filament passageway and to send signals to the sensor module that are indicative of the linear feed rate of the filament; and a control system that is programmed to:
receive signals from the laser sensor,
detect, while driving the stepper driver, that the filament is present in the filament passageway and that the filament has stopped feeding, based at least in part on said signals; and
stop operation of the stepper driver upon said detection.

* * * * *